(12) United States Patent
Iseda (10) Patent No.: US 8,335,535 B2
(45) Date of Patent: Dec. 18, 2012

(54) METHOD FOR CONTROLLING TRANSMISSION POWER IN WIRELESS BASE STATION AND WIRELESS BASE STATION

(75) Inventor: Kohei Iseda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 205 days.

(21) Appl. No.: 12/694,756

(22) Filed: Jan. 27, 2010

(65) Prior Publication Data

US 2010/0130245 A1 May 27, 2010

Related U.S. Application Data (63) Continuation of application No. PCT/JP2007/065288, filed on Aug. 3, 2007.

(51) Int. Cl.
*H04B 7/00* (2006.01)
(52) U.S. Cl. .................. 455/522; 455/127.1; 455/67.11; 455/115.3; 370/318
(58) Field of Classification Search .................. 455/522, 455/69, 70, 67.11, 67.16, 127.1, 115.1, 115.3, 455/450, 452.1; 370/318–322, 329, 252
See application file for complete search history.

(56) References Cited

U.S. PATENT DOCUMENTS

| 7,200,177 | B2 | 4/2007 | Miyoshi |
| 7,424,305 | B2 | 9/2008 | Yamazaki et al. |
| 7,426,176 | B2 | 9/2008 | Liu et al. |
| 7,634,290 | B2 | 12/2009 | Kelton et al. |
| 7,894,819 | B2 * | 2/2011 | Chen et al. ..................... 455/450 |
| 8,005,499 | B2 * | 8/2011 | Wigard et al. ................. 455/522 |
| 2003/0218993 | A1 | 11/2003 | Moon et al. |
| 2004/0009783 | A1 | 1/2004 | Miyoshi |
| 2004/0062192 | A1 | 4/2004 | Liu et al. |
| 2006/0067389 | A1 | 3/2006 | Tounai et al. |
| 2006/0126749 | A1 | 6/2006 | Armour et al. |
| 2006/0240858 | A1 | 10/2006 | Yamazaki et al. |
| 2006/0270433 | A1 | 11/2006 | Kelton et al. |
| 2008/0153536 | A1 | 6/2008 | Yamazaki et al. |

FOREIGN PATENT DOCUMENTS

| JP | 200332218 | 1/2003 |
| JP | 2003348013 | 12/2003 |
| JP | 2004129241 | 4/2004 |

(Continued)

OTHER PUBLICATIONS

International Search Report dated Nov. 6, 2007 from the corresponding International Application No. PCT/JP2007/065288.

(Continued)

*Primary Examiner* — Sujatha Sharma
(74) *Attorney, Agent, or Firm* — Murphy & King, P.C.

(57) ABSTRACT

A wireless base station controls to decrease a transmission power of a first wireless terminal corresponding to signal quality information exceeding lower limitation of a range in which a transmission scheme to be selected remains unchanged and being below a first threshold value, which is greater than the lower limitation and smaller than upper limitation of the range, among a plurality of wireless terminals corresponding to signal quality information belonging to the range, while controlling to increase a transmission power of a second wireless terminal corresponding to signal quality information being equal to or greater than the first threshold value so that a transmission scheme having a better transmission efficiency is selected, thereby to improve throughput of a communication between the wireless base station and the wireless terminal.

14 Claims, 8 Drawing Sheets

FOREIGN PATENT DOCUMENTS

| | | |
|---|---|---|
| JP | 2004247950 | 9/2004 |
| JP | 2004343524 | 12/2004 |
| JP | 200650615 | 2/2006 |
| JP | 2006101345 | 4/2006 |
| JP | 2006237897 | 9/2006 |
| JP | 2006340364 | 12/2006 |

OTHER PUBLICATIONS

Korean Patent Office dated Jun. 14, 2011 received in Korean Patent Application No. 10-2010-7002007.

* cited by examiner

| RECEPTION QUALITY INFORMATION | DOMAIN |
|---|---|
| $B \leq SINR < B1$ | (1) DOMAIN IN WHICH MODULATION SCHEME AND CODING RATE CHANGE TO ONES PROVIDING A LOWER THROUGHPUT WHEN RECEPTION QUALITY INFORMATION DETERIORATES A LITTLE |
| $B1 \leq SINR < B2$ | (2) DOMAIN IN WHICH MODULATION SCHEME AND CODING RATE REMAIN UNCHANGED EVEN WHEN RECEPTION QUALITY INFORMATION CHANGES A LITTLE |
| $B2 \leq SINR < C$ | (3) DOMAIN IN WHICH MODULATION SCHEME AND CODING RATE CHANGE TO ONES PROVIDING A HIGHER THROUGHPUT WHEN RECEPTION QUALITY INFORMATION IMPROVES A LITTLE |

| RECEPTION QUALITY INFORMATION | MODULATION SCHEME (CODING RATE) |
|---|---|
| SINR < A | — |
| A ≦ SINR < B | 16QAM (1/2) |
| B ≦ SINR < C | 16QAM (3/4) |
| SINR > C | 64QAM (2/3) |

METHOD FOR CONTROLLING TRANSMISSION POWER IN WIRELESS BASE STATION AND WIRELESS BASE STATION

CROSS-REFERENCE TO RELATED APPLICATION

This application is a continuation Application of a PCT international application No. PCT/JP2007/065288 filed on Aug. 3, 2007 in Japan, the entire contents of which are incorporated by reference.

FIELD

The embodiments discussed herein are related to a method for controlling transmission power in a wireless base station and the wireless base station.

BACKGROUND

In a wireless communication system having a wireless base station (BS: Base Station) and a wireless mobile station (MS: Mobile Station), the MS can communicate with another MS, a wire terminal, a server or the like via the BS.

As one of the above wireless communication systems, there is WiMAX system in conformity with a system called WiMAX (World wide Interoperability for Microwave Access) that is under development in these years. The WiMAX system employs Orthogonal Frequency Division Multiplexing Access (OFDMA) and Adaptive Modulation and Coding (AMC) in order to improve the communication efficiency.

In a wireless frame used in WiMAX systems, a subframe (DL subframe) in the downlink (DL) in a direction from a BS to a MS and a subframe (UL subframe) in the uplink (UL) in a direction from the MS to the BS are time-division-multiplexed.

In the DL subframe, preamble, frame control header (FCH), map information in DL (DL map), map information in UL (UL map) (hereinafter, these will be occasionally referred to as header information) and one or more DL bursts are multiplexed in a two dimensional region expressed by time axis (symbol time) and frequency axis (subchannel frequency). In the UL sub frame, one or more UL bursts are multiplexed. Incidentally, "burst" signifies a wireless resource (communication region) specified by subchannel frequency and time (transmission timing).

Preamble is a region (field) into which frame synchronization information is inserted. FCH is a region into which information defining map information such as size, position, etc. of the map information is inserted. Map information includes information about ID (CID) of a communication connection to be transmitted in a burst, arranged position (burst position) of the burst of the connection in the wireless frame, size of the burst (burst size), modulation scheme of the burst (QPSK, 16QAM, 64QAM, etc.) and coding rate of the burst, transmission power control information (boost up/down), etc.

Namely, it can be said that the map information is information (burst allocation information) that specifies (allocates) regions (reception region and transmission region) of a wireless frame to be received by or transmitted from the MS. The burst position can be specified by a symbol offset from the leading symbol and a subchannel offset. The burst size can be specified by a symbol number and a subchannel number.

Accordingly, the MS can establish wireless frame synchronization of DL and UL by detecting the preamble, demodulate and decode a DL burst region specified by the DL map in a demodulation scheme and at a decoding rate corresponding to a modulation scheme, a coding rate, etc. specified by the DL map, thereby to selectively receive the DL burst destined for the MS. The MS can transmit data to the BS in the UL burst region specified by the UL map.

Further, the MS can measure communication quality (reception quality) in a wireless section between the MS and the BS and report, regularly or irregularly, the result of the measurement (reception quality information such as SINR: Signal to Interference and Noise Ratio, etc. for example) to the BS. The BS can thereby adaptively control the modulation scheme and coding rate in each burst on the basis of the reception quality information from the MS. This is called AMC (Adaptive Modulation and Coding).

As a power allocation method in OFDMA systems, a method is described in the following patent document 1 below, in which a transmission power level for each wireless unit is selected in response to CQI of the wireless unit.

Moreover, in the patent document 2 below, there is described a method as a method for allocating subcarriers to subchannels to be allocated to at least one user in a multi user communication system using a plurality of subcarriers, in which the quality of each subchannel is detected and a subchannel is allocated to the subcarrier according to the quality level.

Patent Document 1: Japanese Patent Publication No. 2004-129241

Patent Document 2: Japanese Patent Publication No. 2006-50615

Figure 7:
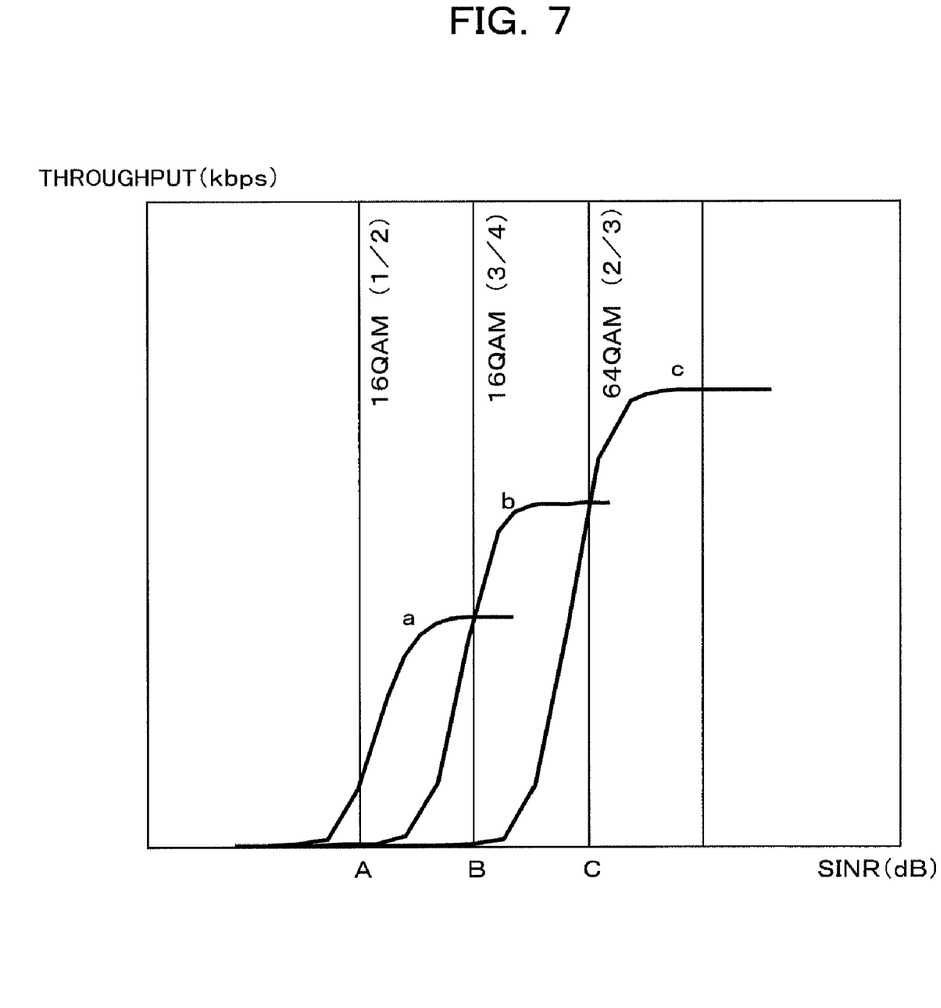
FIG. 7 is a Diagram illustrating throughput characteristics of modulation schemes and coding rates.
Figure 8:
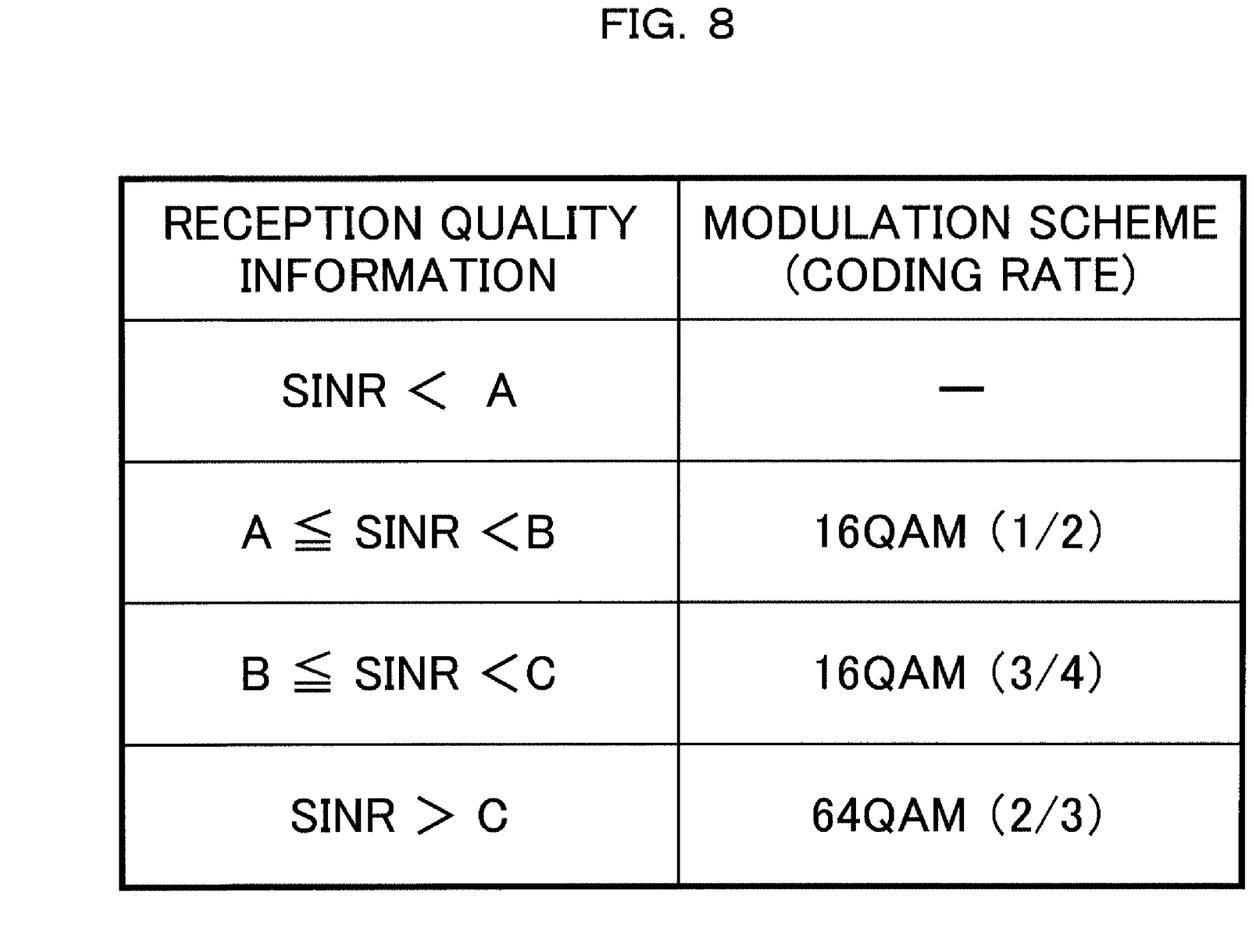
FIG. 8 is a Diagram illustrating an example of AMC control.

Now, the above-described AMC control will be described with reference to FIGS. 7 and 8. FIG. 7 is a diagram illustrating a throughput characteristic of DL obtained in each modulation scheme and at each coding rate. FIG. 8 is a diagram illustrating an example of the AMC control.

As illustrated in FIG. 7, the relationship between SINR and throughput is a stage-like relationship when SINR is represented by the horizontal axis and the throughput is represented by the vertical axis, and a suitable modulation scheme and coding rate exist according to communication environments (the above-mentioned reception quality information at the MS) in a wireless section between the MS and the BS. For example, as illustrated in FIG. 8, when SINR (dB) which is the reception quality information from the MS is a value not less than A and below B, the BS selects 16QAM (½) (figure in parenthesis representing coding rate) illustrating a throughput (kbps) characteristic designated by a symbol a in FIG. 7.

Likewise, when SINR from the MS is a value not less than B and below C in FIG. 8, the BS selects 16QAM (¾) illustrating a throughput characteristic designated by a symbol b in FIG. 7. When SINR from the MS is a value not less than C in FIG. 8, the BS selects 64QAM (⅔) illustrating a throughput characteristic designated by a symbol c in FIG. 7.

In this way, the BS selects a suitable modulation scheme and coding rate according to communication environments between the BS and the MS to transmit data to the MS.

When attention is given to an MS that has reported SINR close to B, which is the upper limitation value of a range of A≦SINR<B, among MSs that have reported SINRs in this range illustrated in FIG. 8, a little improvement in the SINR allows the modulation scheme (coding rate) to be selected by the BS to step up from 16QAM (½) to 16QAM (¾), which allows a large increase in throughput.

Likewise, when an MS that has reported an SINR close to C, which is the upper limitation value of a range of B≦SINR<C in FIGS. 7 and 8, among MSs that have reported SINRs, a little improvement in the SINR allows a modulation scheme (coding rate) to be selected by the BS to step up to 64QAM (⅔) from 16QAM (¾), which allows a large increase in throughput.

Therefore, if an SINR measured by an MS that has reported the SINR in the vicinity of a border across which the modulation scheme (coding rate) to be selected by the MS is changed as above is improved, a large increase in throughput can be expected.

Since the reception SINR at the MS can be improved by increasing the transmission power from the BS, the transmission power of an DL burst destined for the MS is increased (boosted up) on the BS's side.

However, the following problem will occur when the above transmission power increase control is realized.

Namely, upper limitation of a sum of transmission powers in the frequency axial (subcarrier frequency) direction in a certain symbol (time) in a wireless frame is set by the law, limitation of the transmission amplifier, etc. Therefore, when bursts are allocated so that all subcarriers in the frequency axial direction are used in a certain symbol, and, hence, the transmission power reaches the upper limitation, the above transmission power increase control is not executable.

SUMMARY (1) According to an aspect of the embodiments, a method includes a method for controlling transmission power in a wireless base station which selects any one of a plurality of transmission schemes having different transmission efficiencies for a wireless terminal according to signal quality information between the wireless base station and the wireless terminal and transmits to the wireless terminal, the method including, on the wireless base station, obtaining signal quality information between the wireless base station and each of a plurality of wireless terminals, and controlling to decrease a transmission power of a first wireless terminal corresponding to signal quality information exceeding lower limitation of a range in which a transmission scheme to be selected remains unchanged and being below a first threshold value, which is greater than the lower limitation and smaller than upper limitation of the range, among a plurality of wireless terminals corresponding to the signal quality information belonging to the range, while controlling to increase a transmission power of a second wireless terminal corresponding to signal quality information being equal to or greater than the first threshold value so that a transmission scheme having a better transmission efficiency is selected.

(2) According to an aspect of the embodiments, an apparatus includes a wireless base station selecting any one of a plurality of transmission schemes having different transmission efficiencies for a wireless terminal according to signal quality information between the wireless base station and the wireless terminal and transmitting to the wireless terminal, including a signal quality information obtainer that obtains signal quality information between each of a plurality of wireless terminals and the wireless base station, and a controller that controls to decrease a transmission power of a first wireless terminal corresponding to signal quality information exceeding lower limitation of a range in which a transmission scheme to be selected remains unchanged and being below a first threshold value, which is greater than the lower limitation and smaller than upper limitation of the range, among a plurality of wireless terminals corresponding to the signal quality information belonging to the range, while controlling to increase a transmission power of a second wireless terminal corresponding to signal quality information being equal to or greater than the first threshold value so that a transmission scheme having a better transmission efficiency is selected.

(3) According to an aspect of the embodiments, a method includes a method for controlling transmission power in a wireless base station which selects a better transmission scheme when signal quality information between the wireless base station and a wireless terminal is better, and transmits to the wireless terminal, the method including, on the wireless base station, obtaining signal quality information between each of a plurality of wireless terminals and base station, and controlling distribution of transmission powers to wireless terminals corresponding to signal quality information in a range in which a transmission scheme to be selected remains unchanged so that a transmission scheme to any one of the wireless terminals is better than a transmission scheme selected based on the signal quality information according to a position of the wireless terminal in the range of the signal quality information.

(4) According to an aspect of the embodiments, an apparatus includes a wireless base station including a transmitter that increases a transmission power of at least first wireless terminal among a plurality of wireless terminals having reception quality information lying in a predetermined range to provide a reception quality exceeding the predetermined range, and transmits data in a first transmission scheme, while decreasing a transmission power of at least second wireless terminal among the plural wireless terminals to provide a reception quality in the predetermined range, and transmitting data in a second transmission scheme slower than the first transmission scheme, and a time zone being provided, in which a transmission period in the first transmission scheme and a transmission period in the second transmission scheme are at least overlapped.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will be described with reference to the drawings. Note that the embodiments are not limited to the embodiments to be described below, but may be modified in various ways without departing from sprits and scope of the embodiments, as a matter of course.

[A] Description of Embodiment

Figure 1:
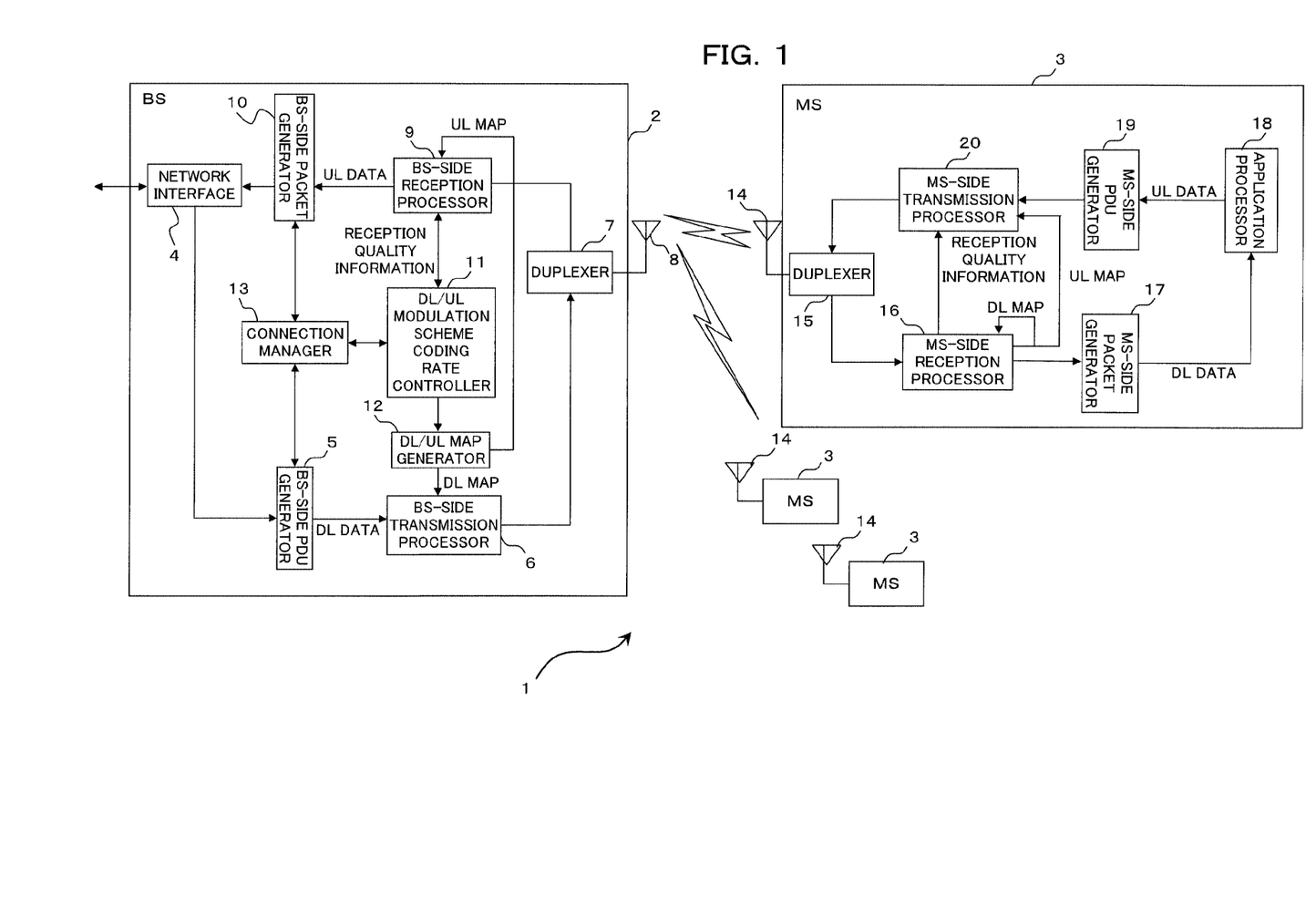
FIG. 1 is a Block diagram illustrating configuration of essential parts of a wireless communication system according to an embodiment.

FIG. 1 is a block diagram illustrating a configuration of essential parts of a wireless communication system according to an embodiment. The wireless communication system 1 illustrated in FIG. 1 has a plurality of wireless mobile terminals (MS) 3 and a wireless base station (BS) 2 performing wireless communications with these MSs 3. The BS 2 multiplexes transmission data in a wireless frame in OFDMA system, for example, and transmits downlink data to the plural MSs 3. On the other hand, the MS 3 measures signal quality information (reception quality information) (SINR, etc.) about the downlink data received from the BS 2, and reports the signal quality information to the BS 2.

(Explanation of MS 3)

When attention is given to functions of essential parts of the MS 3, the MS 3 illustrated in FIG. 1, for example, has an antenna 14, a duplexer 15, an MS-side reception processor 16, an MS-side packet generator 17, an application processor 18, an MS-side PDU generator 19 and an MS-side transmission processor 20.

The antenna 14 has a function of transmitting a wireless signal in UL destined for the BS 2 to the BS, while receiving a wireless signal in DL from the BS 2.

The duplexer 15 has a function of outputting a wireless signal in UL fed from the MS-side transmission processor 20 to the antenna 14, while outputting a wireless signal in DL (including map information) received from the BS 2 via the antenna 14 to the MS-side reception processor 16.

The MS-side reception processor 16 performs a predetermined receiving process on a reception signal from the BS 2 fed from the duplexer 15. For example, the MS-side reception processor 16 can extract map information (DL/UL map) from the reception signal, and can demodulate and decode the signal in a demodulation scheme and decoding scheme according to a transmission scheme of the DL burst such as a modulation scheme, coding rate, etc. specified by the DL map.

In addition, the MS-side reception processor 16 has also a function of measuring, regularly or irregularly, reception quality information such as SINR, etc. on the basis of the reception signal from the BS 2. The measured reception quality information is notified to the MS-side transmission processor 20 together with the UL map, and transmitted (reported) in a UL burst specified by the UL map from the MS-side transmission processor 20 to the BS 2.

The MS-side packet generator 17 generates DL data (DL packet) on the basis of the reception signal from the BS 2, and sends the generated packet to the application processor 18.

The application processor 18 generates transmission data (UL data) destined for the BS 2 according to a predetermined application process. The application processor 18 can generate a response to the DL data fed from the MS-side packet generator 17 as DL data, for example.

The MS-side PDU generator 19 generates PDU (Protocol Data Unit) on the basis of the UL data from the application processor 18. PDU is a unit of data handled by a protocol of the transmission packet. For example, PDU of TCP/IP (Transmission Control Protocol/Internet Protocol) is "packet", while PDU of ATM (Asynchronous Transfer Mode) is "cell". To the head of PDU, communication control information such as header, etc. used in a protocol of the transmission data, aside from the main body of data, is attached.

The MS-side transmission processor 20 performs a predetermined transmission process on the PDU from the MS-side PDU generator 19. The MS-side transmission processor 20 has a function of encoding and modulating the PDU at a coding rate and in modulation scheme specified by the UL map extracted by the MS-side reception processor 16, for example. Incidentally, the MS-side transmission process 20 in this example has a function of mapping the reception quality information measured by the MS-side reception processor 16 into a UL burst specified by the UL map, and transmitting the information to the BS 2, too.

With the above configuration, the MS 3 in this example can determine reception quality information such as SINR, etc. on the basis of a reception signal from the BS 2, and can transmit (report), regularly or irregularly, the reception quality information to the BS 2.

(Explanation of BS 2)

On the other hand, the BS 2 illustrated in FIG. 1 has a network interface 4, a BS-side PDU generator 5, a BS-side transmission processor 6, a duplexer 7, an antenna 8, a BS-side reception processor 9, a BS-side packet generator 10, a DL/UL modulation scheme coding rate controller 11, a DL/UL map generator 12, and a connection manager 13, for example, when attention is given to functions of essential part of the BS 2.

Here, the antenna 8 has a function of sending a wireless signal in DL destined for the MS 3, while receiving a wireless signal in UL from the MS 3.

The duplexer 7 has a function of outputting a wireless signal in DL fed from the BS-side transmission processor 6 to the antenna 8, while outputting the wireless signal in UL received by the antenna 8 to the BS-side reception processor 9.

The BS-side reception processor (signal quality information obtainer) 9 performs various reception processes on a signal received from the MS 3 via the antenna 8 and the duplexer 7. For example, the BS-side reception processor 9 has a function of demodulating and decoding a reception signal (UL burst) in a demodulation scheme and decoding scheme in conformity with a modulation scheme and coding rate specified in UL map to the MS 3 to obtain UL data, and a function of notifying the DL/UL modulation scheme coding rate controller 11 of reception quality information measured by the MS 3 when the reception quality information is contained in the UL burst (UL data). The reception quality information may be measured on the basis of UL data received by the BS 2. In which case, this measuring function can be provided to the BS-side reception processor 9. On such occasion, the reception quality information measured by the BS 3 on the basis of UL data is uplink reception quality information (reception quality information on the side of BS 2). When the communication quality is similar in both uplink and downlink, the above reception quality information is proportional to the transmission power on the transmission side. Accordingly, the BS 2 can correct the reception quality information on the side of the BS 2 on the basis of a ratio of a transmission power of the BS 2 to a known transmission power of the MS 3, and can calculate the reception quality information (downlink reception information) on the side of the MS 3.

The BS-side packet generator 10 has a function of generating a packet to be transferred to the host network (not illustrated) such as IP (Internet Protocol) network, ATM network or the like and DL data such as a response packet or the like to the received UL data on the basis of the UL data from the BS-side reception processor 9 and a connection ID managed in the connection manager 13.

The network interface 4 has an interface function (function or the like performing various protocol controls) with the host network such as IP network, ATM network or the like. The network interface 4 transfers UL data to the host network, and transfers DL data from the host network destined for the MS 3 or DL data for response to the MS 3 to the BS-side PDU generator 5.

The BS-side PDU generator 5 generates PDU on the basis of DL data from the network interface 4. Aside from the data body, communication control information such as header, etc. used in protocol of the DL data is attached to the head of the PDU.

The connection manager 13 manages a communication connection (CID) between the BS 2 and the MS 3. The BS-side packet generator 10, the BS-side PDU generator 5 and the DL/UL modulation scheme coding rate controller 11 perform respective processes (mapping of UL/DL bursts, transmission process, etc.) on the basis of management information of the connection manager 13.

The DL/UL modulation scheme coding rate controller 11 has a function of controlling (selecting) a modulation scheme and coding rate for DL and UL data (burst), that is, performing the above-described AMC control, on the basis of reception quality information from the BS-side reception processor 9.

In other words, the DL/UL modulation scheme coding rate controller 11 has a function of selecting a transmission scheme for DL data destined for each MS 3 on the basis of the reception quality information.

The DL/UL map generator 12 generates map information (DL map and UL map) under control of the DL/UL modulation scheme coding rate controller 11. In this example, the DL/UL map generator 12 generates map information including information (CID of DL burst to be controlled, transmission power information, etc.) for performing a control that increases (boosts up) transmission power of a DL burst destined for an MS 3 corresponding to reception quality information (hereinafter, also simply referred to as "reception SINR") in the vicinity of a border across which the transmission scheme selected by the BS 2 changes to better conditions when the reception quality information is improved by a constant quantity, and decreases (boosts down) a transmission power of a DL burst destined for another MS 3 within a range in which the transmission power in the frequency axial direction does not exceed upper limitation of the transmission power resulting from the increase in transmission power.

On such occasion, it is preferable that the DL/UL map generator 12 generate map information including information (CID of a DL burst to be controlled, transmission power information, etc.) for a control to decrease (boost down) the transmission power of a DL burst destined for another MS 3 whose transmission scheme is supposed to remain unchanged even when transmission power thereof is decreased.

The map information is configured (generated) so that a DL burst to be boosted up, or a DL burst to be boosted down and other DL burst (that is, DL burst to be neither boosted up nor boosted down) are at respective predetermined positions in the wireless frame, in order to facilitate the boost-up within a range in which the transmission power does not exceed the upper limitation. Details of this will be described later with reference to FIG. 5.

The BS-side transmission processor 6 performs a predetermined transmission process on the DL data from the BS-side PDU generator 5 on the basis of the DL map generated by the DL/UL map generator 12. For example, the BS-side transmission processor 6 has a function of encoding and modulating the DL data at a coding rate and in a modulation scheme specified by the DL map, and a function of controlling (boosting up or boosting down) of the transmission power of the DL burst on the basis of the CID and transmission power information contained in the DL map.

In addition, the BS-side transmission processor (transmitter) 6 has a function of mapping DL bursts into a wireless frame so that DL data destined for an MS 3 [first wireless mobile terminal] whose transmission power is to be decreased (boosted down) under control of the DL/UL map generator 12, DL data destined for an MS 3 [second wireless mobile station] whose transmission power is to be increased (boosted up) under control of the DL/UL map generator 12, and DL data other than the above DL data are in the predetermined positions specified by the DL map.

With the above configuration, the BS 2 according to the embodiment can adaptively change (select) the transmission scheme such as modulation scheme, coding rate, etc. for a DL burst destined for an MS 3 according to reception quality information thereon to transmit the DL burst to the MS 3, and can preferentially boost up the transmission power of a DL burst destined for an MS 3 whose transmission scheme to be selected by the BS 2 can get into better transmission efficiency conditions by a little increase of the transmission power, whereby the better conditions can be selected by the BS 2. Therefore, the throughput of DL can be improved.

(Detailed Description of DL/UL Map Generator 12)

Next, configuration and operation of the above-mentioned DL/UL map generator 12 will be described with reference to FIGS. 2 to 6.

Figure 2:
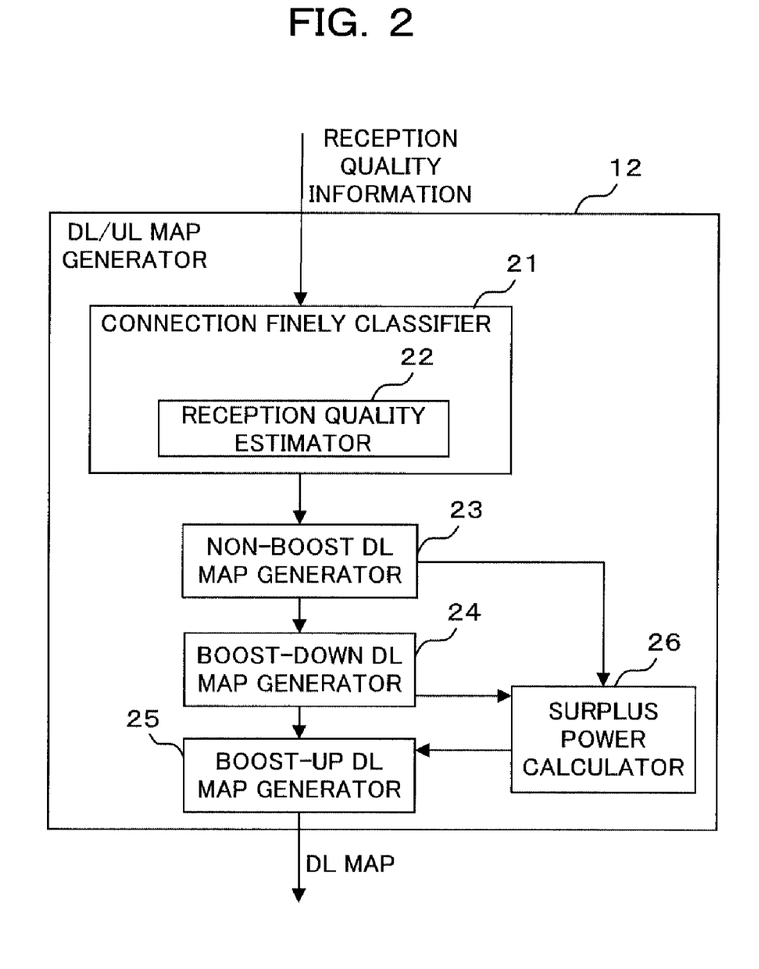
FIG. 2 is a Block diagram illustrating configuration of a BS (DL/UL map generator) illustrated in FIG. 1.

FIG. 2 is a block diagram illustrating a configuration of the DL/UL map generator 12 illustrated in FIG. 1.

As illustrated in FIG. 2, the DL/UL map generator 12 in this example has a connection finely classifier 21 including a reception quality estimator 22, a non-boost DL map generator 23, a boost-down DL map generator 24, a boost-up DL map generator 25 and a surplus power calculator 26.

Figure 3:
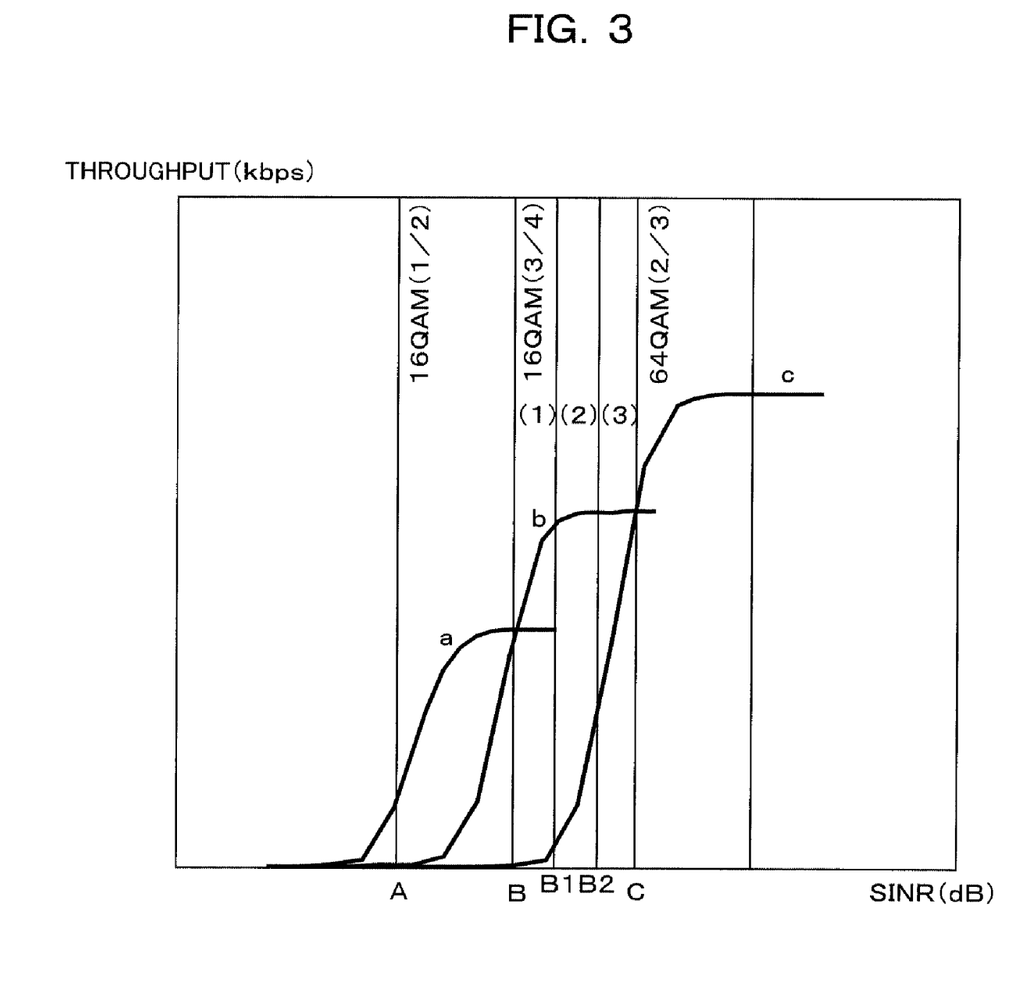
FIG. 3 is a Diagram illustrating throughput characteristics of modulation schemes and coding rates.
Figure 4:
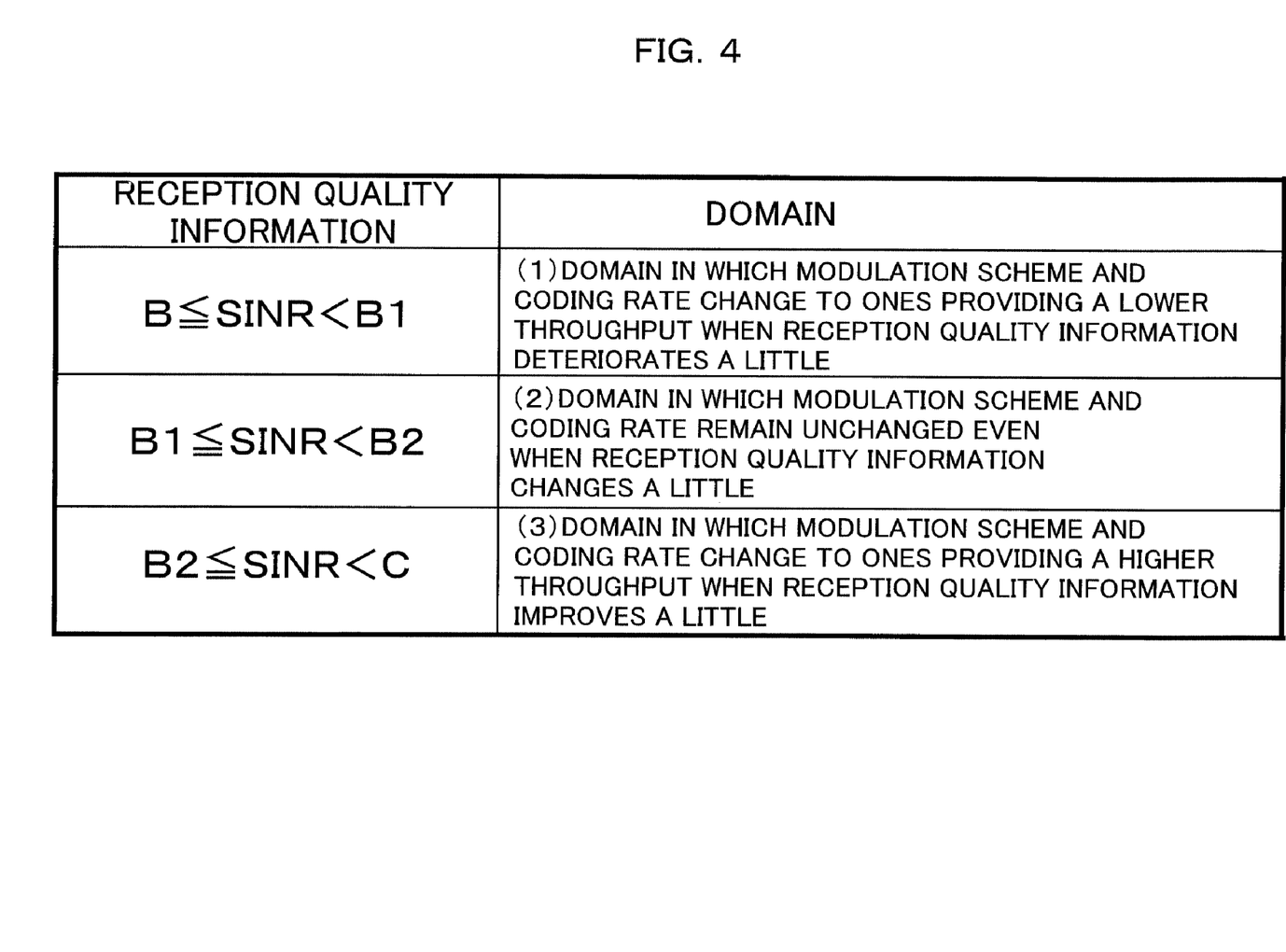
FIG. 4 is a Diagram illustrating a relationship between reception quality information and domain.

Here, the connection finely classifier 21 has a function of managing reception quality information reported from the MS 3 (or reception quality information measured by the BS 2) for each CID of the reception UL burst in association with the connection manager 13, a function of selecting a modulation scheme and coding rate from a selection table equivalent to the selection table illustrated in FIG. 8 on the basis of the reception quality information, and a function of classifying the MS 3 (CID) into any one of three domains, that is, (1) $B \leq SINR < B1$, (2) $B1 \leq SINR < B2$, and (3) $B2 \leq SINR < C$, obtained by finely dividing a domain ($B \leq SINR < C$) in which 16QAM (3/4) is selected, on the basis of the reception quality information, as illustrated in FIGS. 3 and 4, for example.

Here, these domains (1), (2) and (3) mean as follows:

(1) a domain in which a modulation scheme and coding rate having lower efficiency (throughput) are selected when the reception quality information deteriorates a little (by a predetermined quality);

(2) a domain in which the same modulation scheme and coding rate (here, the modulation scheme of 16QAM and coding rate of 3/4) are selected even when the reception quality information changes (deteriorates or improves) by the predetermined quality; and (3) a domain in which a modulation scheme and coding rate having higher throughput (for example, the modulation scheme of 64QAM and the coding rate of 2/3) are selected when the reception quality information improves a little.

Since the reception quality information measured by the MS 3 can be changed by changing the transmission power of a DL burst from the BS 2, the above domains (1), (2), and (3) can have the following meanings:

(1) a domain in which a modulation scheme and coding rate having lower efficiency are selected when the transmission power of the DL burst is decreased a little (by a predetermined quantity);

(2) a domain in which a modulation scheme and coding rate having higher efficiency cannot be selected even when the transmission power of the DL burst is increased a little, or a modulation scheme and coding rate having lower efficiency are not selected even when the transmission power is decreased a little; and (3) a domain in which a modulation scheme and coding rate having higher efficiency can be selected by increasing the transmission power of the DL burst a little.

Therefore, the connection finely classifier 21 retains a classification (selection) table (selection information on transmission scheme) as illustrated in FIG. 4 as data in a table form in a memory or the like not illustrated. This table can be generated from information (which may be logical values or measured values) illustrating a relationship between SINR and throughput illustrated in FIG. 4.

In the above example, a domain of the modulation scheme of 16QAM and coding rate of ¾ is classified (finely divided) as a domain sandwiched by threshold values determining the modulation scheme and coding rate (a domain in which a certain modulation scheme and coding rate are selected when reception quality information lies between these threshold values). However, all or part of domains of usable modulation scheme and coding rate can be classified (finely divided) in the similar manner.

The reception quality estimator 22 has a function of estimating how the SINR reported from each MS 3 is changed (that is, which modulation scheme and coding rate will be selected due to a change in the SINR and how much the throughput of DL will be changed) when boost-up or boost-down of a predetermined quantity is performed with respect to each MS 3. This estimation is accomplished by simulation of the wireless communication system, for example. According to a result of the estimation, each MS 3 is classified into any one of the domains (1), (2), and (3), and each MS 3 is determined to be boosted up, or to be boosted down, or to be one other than these (not boosted).

The non-boost DL map generator 23 generates DL map information on an MS 3 that is determined not to be boosted, that is, an MS 3 belonging to the above domain (1) (B≦SINR<B1).

The boost-down DL map generator 24 generates DL map information on an MS 3 that is determined to be boosted down, that is, an MS 3 belonging to the above domain (2) (B1≦SINR<B2). This map information includes information about CID, DL bust position, transmission power after the boost-down (or a decreased quantity of transmission power), modulation scheme, coding rate, etc. The BS-side transmission processor 6 performs the boost-down (transmission power decrease) control on the DL burst on the basis of the information.

The surplus power calculator 26 calculates a surplus power in the frequency axial direction in the wireless frame on the basis of each piece of the DL map information generated by the non-boost DL map generator 23 and the boost-down DL map generator 24.

The boost-up DL map generator 25 generates DL map information on an MS 3 that is determined to be boosted up, that is, an MS 3 (second wireless terminal) belonging to the above domain (3) (B2≦SINR<C). On this occasion, the boost-up DL map generator 25 can determine a boost-up width of the target DL burst and a mapping position of the same into the wireless frame so that the transmission power does not exceed the surplus power. This DL map information includes information about CID, DL burst position, transmission power after boost-up, modulation scheme, coding rate, etc. On the basis of the information, the BS-side transmission processor 6 performs the boost-up (transmission power increase) control on the DL burst.

As above, the DL/UL map generator 12 has a function as a controller that controls to decrease transmission power of an MS 3 (first wireless mobile station) belonging to the domain (2) [B1 (second threshold value)≦SINR<B2 (first threshold value)] within a range in which the transmission scheme remains unchanged, and controls to increase transmission power of an MS 3 (second wireless mobile station) belonging to the domain (3) [B2 (first threshold value)≦SINR<C] so that a transmission scheme having better transmission efficiency is selected.

In other words, the BS 2 of this embodiment having the above-mentioned DL/UL map generator 12 has a function of controlling distribution of transmission powers to MSs 3 corresponding to reception quality information within a range (B≦SINR<C, in the above example) in which a transmission scheme to be selected according to the reception quality information remains unchanged so that at least any one of the transmission schemes to the BS 2 becomes a better transmission scheme according to a position of the reception quality information in the above range.

In another example, the transmission scheme of part of MSs 3 belonging to [B2 (first threshold value)≦SINR<C] is changed to a faster transmission scheme, while another part of MSs 3 belonging to [B2 (first threshold value)≦SINR<C] are boosted down. It is preferable to boost down the latter MSs 3 to an extent that the transmission scheme is not changed.

It is a matter of course that boosting-up of one MS 3 (L>0) can correspond to boosting-down of one MS 3 (−L). Alternatively, boosting-up of one MS 3 can correspond to boosting-down (Ni: i=1 to M) of a plurality (M: M being a natural number equal to or greater than 2) MSs 3 to realize L≦ΣNi.

Figure 5:
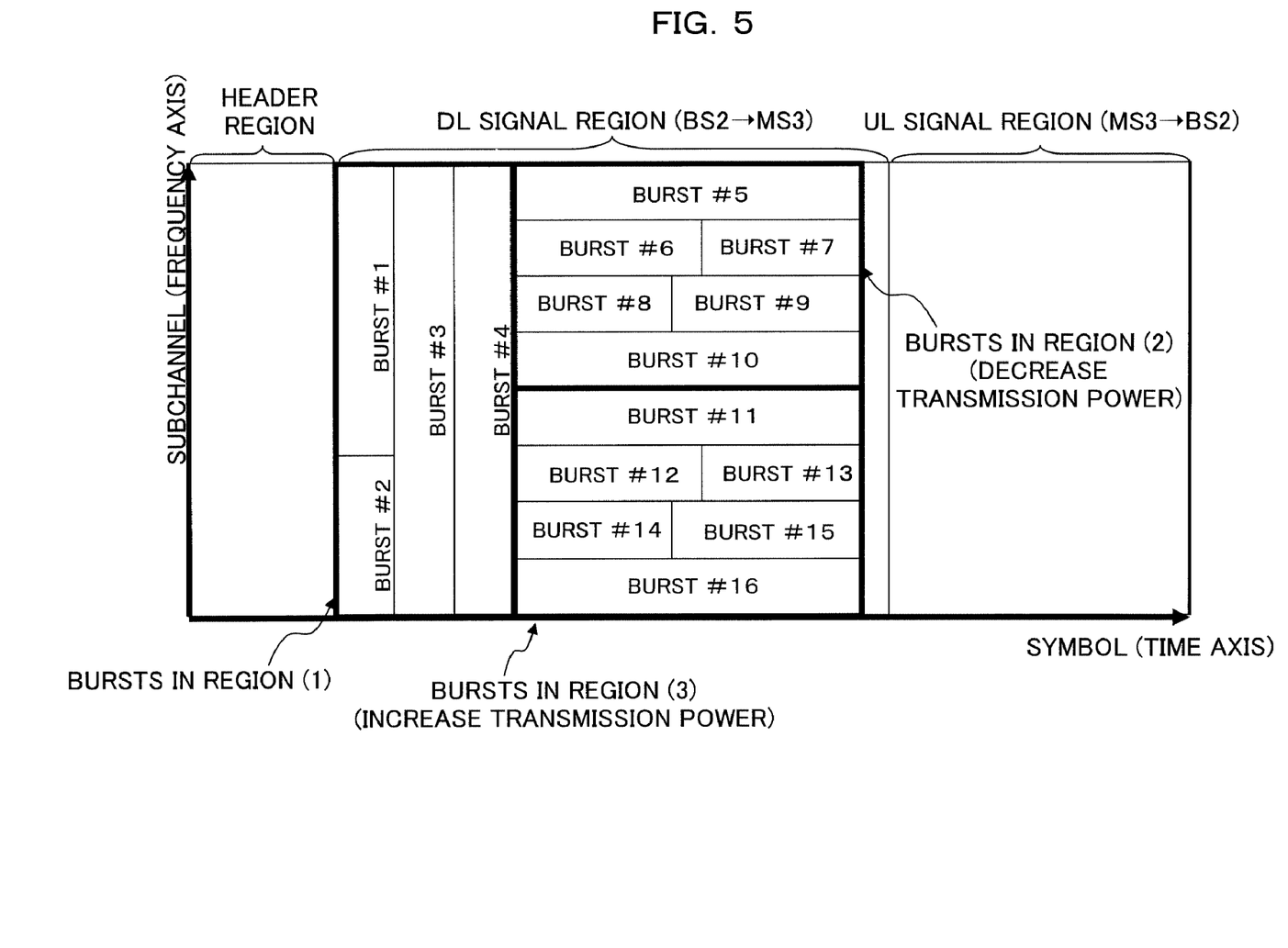
FIG. 5 is a Diagram illustrating burst allocation in a wireless frame.

Now, map information (DL map information) generating operation by the non-boost DL map generator 23, the boost-down DL map generator 24 and the boost-up DL map generator 25 will be described with reference to FIG. 5. FIG. 5 is a diagram illustrating burst allocation in a wireless frame.

As illustrated in FIG. 5, when a wireless frame used in the wireless communication system is a wireless frame in conformity to OFDAM system, header region, DL subframe (DL signal region) and UL subframe (UL signal region) are time-division-multiplexed in the wireless frame. Into the header region, preamble signal, FCH, DL/UL map are mapped. In the DL subframe, UL/DL map, one or more DL bursts are multiplexed in the two dimensional region having a time axis (symbol time) and a frequency axis (subchannel frequency). In the UL subframe, one or more UL bursts are multiplexed.

As illustrated in FIG. 5, the non-boost DL map generator 23 generates burst allocation information as non-boost DL map information, which maps (time-division-multiplexes) DL bursts #1 to #4 destined for MSs 3 that have been determined not to be boosted, that is, MSs 3 that belong to the domain (1) (B≦SINR<B1) so that the DL bursts #1 to #4 are stacked up in the time axial direction as vertically elongated bursts having a larger number of slots in the frequency axial (subchannel) direction than in the time axial (symbol) direction.

Preferably, the non-boost DL map generator 23 arranges the data in the frequency direction in order, and arranges the data in the frequency direction in the similar manner in the next period of time when becoming unable to stack up the data in the frequency direction any more.

Next, the boost-down DL map generator 24 generates burst allocation information as boost-down DL map information, which maps (frequency-division-multiplexes) DL bursts #5 to #10 destined for MSs 3 that have been determined to be boosted down, that is, MSs 3 that belong to the domain (2) (B1≦SINR<B2) so that the DL bursts #5 to #10 are stacked in the frequency axial direction as horizontally elongated bursts having a larger number of slots in the time axial direction than in the frequency axial direction in part of the remaining DL signal region (vacant region), as illustrated in FIG. 4.

Preferably, the boost-down DL map generator 24 arranges the data in the time direction in order, and arranges the data in the time direction in the similar manner in the next frequency after completing arrangement of the data within a predetermined width of time.

On this occasion, the boost-down DL map generator 24 boosts down transmission power information to be included in the DL map information while judging whether or not transmission powers of the DL bursts #5 to #10 to be boosted down can be boosted down within a range in which the modulation scheme and coding rate to be selected remain unchanged.

As illustrated in FIG. 4, the boost-up DL map generator 25 generates burst allocation information as boost-up DL map information, which maps (frequency-division-multiplexes) DL bursts #11 to #16 destined for MSs 3 that have been determined to be boosted up, that is, MSs 3 belonging to the domain (3) (B2≦SINR<C) in the remaining DL signal region (vacant region) as horizontally elongated bursts so that the DL bursts #11 to #16 are stacked in the frequency axial direction.

Preferably, the boost-up DL map generator 25 arranges the data in the time direction in order, and arranges the data in the time direction in the similar manner in the next frequency after completing arrangement of the data within a predetermined width of time.

On this occasion, the boost-up DL map generator 25 boosts up transmission power information to be included in the DL map information within a range in which the transmission power in all periods of time (symbols) does not exceed a predetermined upper limitation value, while judging whether or not transmission powers of the DL bursts #11 to #16 to be boosted up can be boosted up, until a modulation scheme and coding rate having higher efficiency (throughput) become selectable on the basis of a surplus power calculated by the surplus power calculator 26, as described hereinbefore.

The map generators 23 to 25 have a function of generating a map for frequency-division-multiplexing transmission signals destined for the first MSs 3 and transmission signals destined for the second MSs 3 in a certain symbol time and transmitting the transmission signals, a function of performing the increase control within a range in which a sum of the transmission powers in the frequency axial direction in a certain symbol time does not exceed an allowable transmission power, and a function of controlling to hold down a sum of transmission powers of the plural second MSs 3 resulting from the increase control to below a sum of decreased quantities of transmission powers of the plural first MSs 3 resulting from the decrease control.

As above, the DL bursts #5 to #10 and #11 to #16 destined for MSs 3 to be boosted up and boosted down (that is, DL bursts to be transmission-power-controlled) are multiplexed in the frequency axial direction as horizontally elongated bursts, whereby the transmission power control is made easy within a range in which the transmission power does not exceed the upper limitation value in the same period of time (symbol). In other words, the BS 2 controls distribution of the transmission powers of DL bursts in the same period of time (symbol) such that transmission powers of MSs 3 to be boosted up are higher than transmission powers than MSs to be boosted down.

Incidentally, when the burst #11 in the domain (3) is boosted up, the transmission power of the burst #11 can be suppressed by boosting down the bursts #12 and #13. In this case, the domain (2) can have the same arrangement as the domain (1).

Namely, when a certain burst is boosted up, the transmission power in a time zone in which this burst is overlapped can be suppressed by boosting down another burst overlapping entirely or partly on the burst. For example, when the burst #12 is boosted up, bursts overlapping entirely or partly timewise on the burst #12 are bursts except the bursts #7 and #13, hence any one of these bursts can be boosted down.

In other words, the BS 2 according to the embodiment has transmitters 6, 11, 12 and 13, which transmit data in a first transmission scheme (for example, 64QAM (⅔)) so that the transmission power of at least first MSs 3 among a plurality of MSs 3 whose SINRs (reception quality information) lie in a predetermined range (for example, B≦SINR<C) is increased to provide a reception quality exceeding the predetermined range, and transmit data in a second transmission scheme (for example, 16QAM (¾)) slower than the first transmission scheme so that a transmission power of at least second MSs among the plural MSs 3 is decreased to provide a reception quality in the predetermined range. And, the BS 2 provides a time zone in which a transmission period (symbol time) in the first transmission scheme (64QAM (⅔)) and a transmission period (symbol time) in the second transmission scheme (for example, 16QAM (¾)) are at least overlapped.

Since the transmission power in a time zone in which the transmission periods overlap on each other is increased or decreased, the transmission power can be distributed under control, flexibly and readily, which allows an MS 3 to have an SINR exceeding the predetermined range while suppressing the transmission power. As a result, the transmission efficiency (throughput) of the wireless communication system 1 can be improved.

Figure 6:
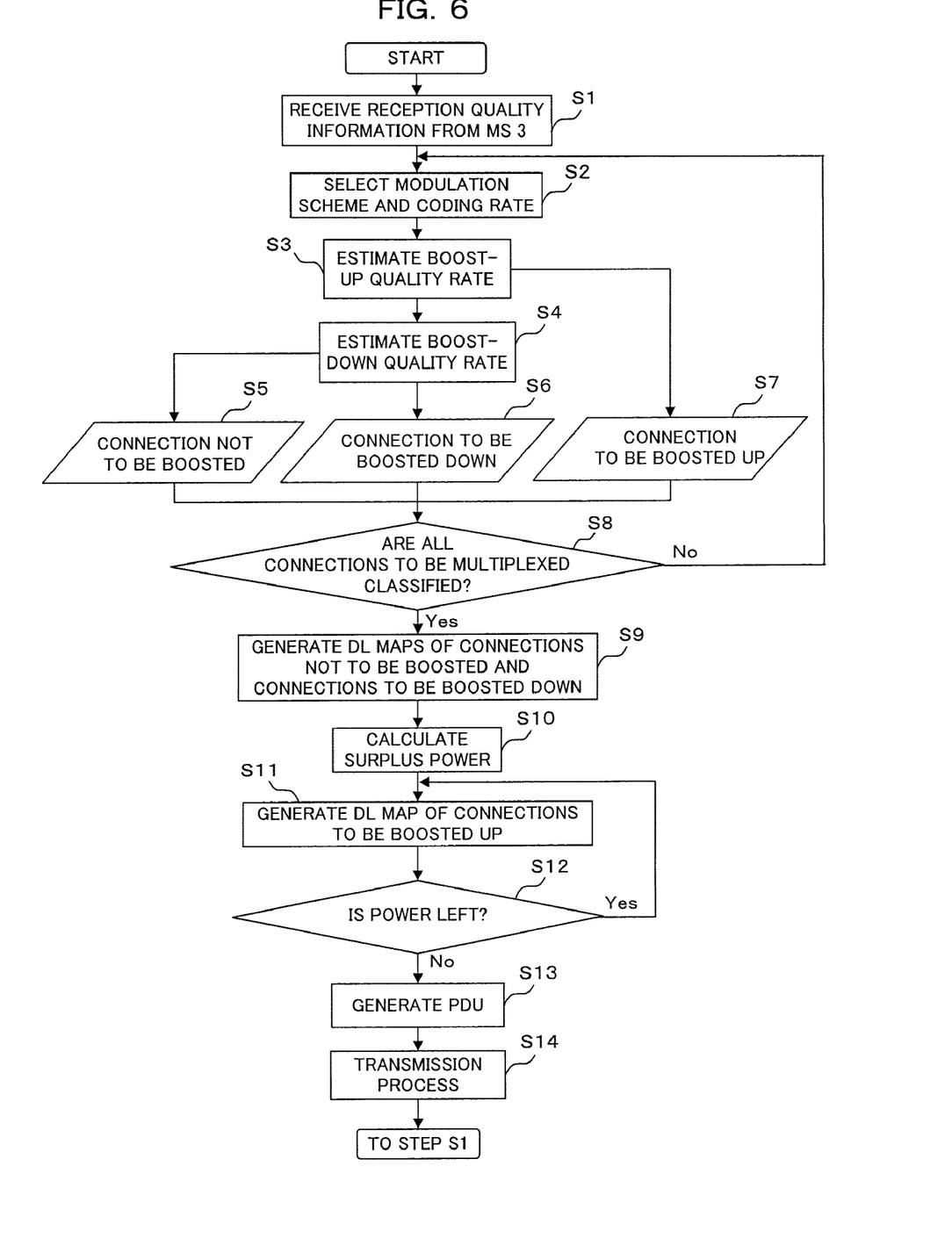
FIG. 6 is a Flowchart illustrating an example of operation of the BS illustrated in FIG. 2.

Next, operation of the above-mentioned BS 2 will be described with reference to FIG. 6. FIG. 6 is a flowchart illustrating an example of the operation of the BS 2.

As illustrated in FIG. 6, the BS-side reception processor 9 obtains reception quality information from a signal received from the MS 3 via the antenna 8 and the duplexer 7 (see step S1), and notifies the DL/UL modulation scheme coding rate controller 11 of the information.

The DL/UL modulation scheme coding rate controller 11 controls (selects) the modulation scheme and coding rate of DL and UP data (bursts) on the basis of the reception quality information received from the MS 3 fed from the BS-side reception processor 9 and reception quality information of the BS 2 (see step S2).

Next, the DL/UL map generator 12 (connection finely classifier 21, reception quality estimator 22) estimates how SINR reported from each MS 3 changes when boosting-up or boosting-down in a predetermined quantity is performed on the MS 3 (see steps S3 and S4), and classifies MSs 3 with respect to connections into MSs 3 to be boosted up, MSs 3 to be boosted down and other MSs 3 (MSs 3 to be neither boosted up nor boosted down) on the basis of a result of the estimation (see steps S5 to S7).

The DL/UL map generator 12 judges (confirms) whether all the connections are classified (see step S8). When there remains a connection that is not yet classified (see No route at step S8), the DL/UL map generator 12 again performs the process at the above steps S2 to S7. When the DL/UL map generator 12 judges that all the connections are classified (see Yes route at step S8), the non-boost DL map generator 23 generates DL map information on an MS 3 that has been determined to be a connection that is to be neither boosted up nor boosted down, that is, an MS 3 belonging to the domain (1) (B≦SINR<B1), and the boost-down DL map generator 24 generates DL map information on an MS 3 (first wireless mobile terminal) that has been determined to be boosted down, that is, an MS 3 belonging to the domain (2) (B1≦SINR<B2) (see step S9). This DL map information includes information about such as CID, DL burst position, modulation scheme and coding rate selected at the above step 2, transmission power after boost-down, etc. The BS-side transmission processor 6 performs a boost-down (transmission power decrease) control on the DL burst on the basis of the above information.

The surplus power calculator 26 calculates a surplus power in the frequency axial direction in the wireless frame on the basis of each piece of the DL map information generated by the non-boost DL map generator 23 and the boost-down DL map generator 24 (see step S10). The boost-up DL map generator 25 generates DL map information on an MS 3 determined to be boosted up, that is, an MS 3 (second wireless mobile terminal) belonging to the domain (3) (B2≦SINR<C) (see step S11). This DL map information includes information about such as CID, DL burst position, modulation scheme and coding rate selected at the above step 2, transmission power after boost-up, etc. The BS-side transmission processor 6 performs the boost-up (transmission power increase) control on the DL burst on the basis of the information.

The boost-up DL map generator 25 judges whether or not there is a room (margin) in the surplus power in the frequency axial direction in the wireless frame on the basis of a result of the surplus power calculation by the surplus power calculator 26 when generating the DL map information on the MS 3 determined to be boosted up (see step S12). When judging that there remains a room (margin) in the surplus power (see Yes route at step S12), the boost-up DL map generator 25 again generates DL map information on an MS 3 to be boosted up at step S11. On the other hand, when judging that there remains no room (margin) in the surplus power (see No route at step S12), the BS-side PDU generator 5 generates PDU (see step S13).

The BS-side transmission processor 6 maps DL data destined for MSs 3 (first wireless mobile terminals) to be boosted down, DL data destined for MSs 3 (second wireless mobile terminals) to be boosted up, and DL data other than these into DL bursts in a wireless frame, performs a predetermined wireless transmission process (modulation, encoding, etc.), and transmits the data to the MSs 3 (see step S14).

The BS 2 performs the AMC control according to reception quality information reported from the MSs 3 after the above transmission power control (see steps S1 and S2).

As above, the BS 2 can accomplish communications with the MSs 3 in better transmission schemes in the procedure of process illustrated in FIG. 6 without a large change in apparatus. As a result, the transmission efficiency (throughput) of the wireless communication system 1 can be improved.

Since the BS 2 performs the above increase control within a range in which a sum of transmission powers in the frequency axial direction in a certain symbol time does not exceed an allowable transmission power, the above effect can be obtained without a large change in apparatus configuration of the BS 2, which leads to a reduction in cost.

[B] Others

Having been described the embodiment in detail, the embodiments are not limited to the above embodiment, but may be modified in various ways without departing from the spirit and scope of the embodiments.

For example, the transmission power control is carried out on MSs 3 belonging to a domain (B≦SINR<C) of modulation scheme of 16QAM and coding rate of ¾ in the above embodiment, as illustrated in FIG. 3. However, the transmission power control may be carried out on MSs 3 belonging to other domains (for example, A≦SINR<B, B≦SINR<C) in the similar manner.

In the above embodiment, the reception quality estimator 22 estimates how SINR reported from each MS 3 changes when boost-up or boost-down in a predetermined quantity is carried out on each of the MSs 3, and each of the MSs 3 is classified into any one of the domains illustrated in FIG. 3 on the basis of a result of the estimation. However, a simpler manner for classification may be adopted. For example, a domain from B to C illustrated in FIG. 3 may be divided into three equal domains, and the MSs 3 may be classified according to which region SINR reported from each of the MSs 3 belongs to. In this way, the estimating process by the reception quality estimator 22 can be omitted, which can attain more simplified process and more sped-up operation in the BS 2.

In the above embodiment, the BS 2 preferentially boosts up the transmission power of a DL burst destined for an MS 3 to be boosted up, and then, selects a transmission scheme having better efficiency according to SINR reported from the MS 3. Alternatively, the BS 2 may select the transmission scheme for the MS 3 after the BS 2 boosts up or boosts down before receiving an SINR report from the MS 3, for example. If the BS 2 spontaneously selects a transmission scheme having better efficiency for the MS 3 to be boosted up, the BS 2 can select (change) the transmission scheme for the MS 3 more quickly. This makes it possible to improve the throughput of the entire wireless communication system 1.

The embodiments are not limited to a WiMAX system stated above. For example, the embodiments are applicable to a communication system in which the BS 2 controls the transmission power of the MS 3, and selects a transmission scheme for the MS 3 to carry out transmission.

The embodiments mentioned above provide the following effects and advantages:

(1) The wireless base station obtains signal quality information between the wireless base station and each of a plurality of wireless terminals, and controls to decrease a transmission power of a first wireless terminal corresponding to signal quality information exceeding lower limitation of a range in which a transmission scheme to be selected remains unchanged and being below a first threshold value, which is greater than the lower limitation and smaller than the range, among a plurality of wireless terminals corresponding to signal quality information belonging to the range, while controlling to increase a transmission power of a second wireless terminal corresponding to signal quality information being equal to or greater than the first threshold value so that a transmission scheme having a better transmission efficiency is selected. This makes it possible to realize a communication between the wireless base station and the wireless terminal in a better transmission scheme without a large change in apparatus, and to improve the transmission efficiency (throughput) of the wireless communication system.

(2) The wireless base station controls to decrease the transmission power of the first wireless terminal corresponding to signal quality information exceeding lower limitation of the range and lying between a second threshold value which is smaller than the first threshold value and the first threshold value. This makes it possible to carry out the control on the transmission power efficiently, and to improve the throughput of the wireless communication system more effectively.

(3) Further, the wireless base station frequency-division-multiplexes a transmission signal destined for the first wireless terminal and a transmission signal destined for the second wireless terminal in a certain symbol time, and transmits the transmission signals. This makes it possible to use bursts in the wireless frame more efficiently, and therefore the improvement of transmission efficiency of the wireless communication system can be realized.

(4) The wireless base station performs the increase control within a range that a sum of transmission powers in the frequency axial direction does not exceed an allowable transmission power in a certain symbol time. This makes it possible to provide the above effects without changing the apparatus configuration in the wireless base station, and therefore a reduction of the cost can be achieved.

As stated above, the embodiments can improve the transmission efficiency (throughput) of the entire wireless communication system. Therefore, the embodiments are useful in the field of wireless communication techniques, for example, the field of mobile wireless communication techniques having AMC function.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A method for controlling transmission power in a wireless base station which selects any one of a plurality of transmission schemes having different transmission efficiencies for a wireless terminal according to signal quality information between the wireless base station and the wireless terminal and transmits to the wireless terminal, the method comprising:

on the wireless base station,
obtaining signal quality information between the wireless base station and each of a plurality of wireless terminals; and
controlling to decrease a transmission power for a first wireless terminal corresponding to signal quality information exceeding lower limitation of a range in which a transmission scheme to be selected remains unchanged and being below a first threshold value, which is greater than the lower limitation and smaller than upper limitation of the range, among a plurality of wireless terminals corresponding to the signal quality information belonging to the range, while controlling to increase a transmission power for a second wireless terminal corresponding to signal quality information being equal to or greater than the first threshold value so that a transmission scheme having a transmission efficiency, which is higher than a transmission efficiency of a transmission scheme selected according to the signal quality information being in the range, is selected.

2. The method for controlling transmission power in a wireless base station according to claim 1, wherein the wireless base station controls to decrease a transmission power for the first wireless terminal corresponding to signal quality information exceeding lower limitation of the range and lying between a second threshold value which is smaller than the first threshold value and the first threshold value.

3. The method for controlling transmission power in a wireless base station according to claim 2, wherein the wireless base station frequency-division-multiplexes a transmission signal destined for the first wireless terminal and a transmission signal destined for the second wireless terminal in a certain symbol time, and transmits the transmission signals.

4. The method for controlling transmission power in a wireless base station according to claim 2, wherein the wireless base station controls to increase the transmission power so that a sum of transmission powers in a frequency axial direction in a certain symbol time does not exceed an allowable transmission power.

5. The method for controlling transmission power in a wireless base station according to claim 1, wherein the wireless base station controls to hold down a sum of increased quantities of transmission powers resulting from the increase control on a plurality of the second wireless terminals to a sum of decreased quantities of transmission powers or below resulting from the decrease control on a plurality of the first wireless terminals.

6. The method for controlling transmission power in a wireless base station according to claim 1, the signal quality information is reception signal quality information measured and reported by the wireless terminal.

7. The method for controlling transmission power in a wireless base station according to claim 1, the signal quality information is reception signal quality information measured based on a reception signal from the wireless terminal.

8. A wireless base station selecting any one of a plurality of transmission schemes having different transmission efficiencies for a wireless terminal according to signal quality information between the wireless base station and the wireless terminal and transmitting to the wireless terminal, comprising:

a signal quality information obtainer that obtains signal quality information between each of a plurality of wireless terminals and the wireless base station; and
a controller that controls to decrease a transmission power for a first wireless terminal corresponding to signal quality information exceeding lower limitation of a range in which a transmission scheme to be selected remains unchanged and being below a first threshold value, which is greater than the lower limitation and smaller than upper limitation of the range, among a plurality of wireless terminals corresponding to the signal quality information belonging to the range, while controlling to increase a transmission power for a second wireless terminal corresponding to signal quality information being equal to or greater than the first threshold value so that a transmission scheme having a transmission efficiency, which is higher than a transmission efficiency of a transmission scheme selected according to the signal quality information being in the range, is selected.

9. The wireless base station according to claim 8, wherein the controller controls to decrease a transmission power for the first wireless terminal corresponding to signal quality information exceeding lower limitation of the range and lying between a second threshold value which is smaller than the first threshold value and the first threshold value.

10. The wireless base station according to claim 9, wherein the controller frequency-division-multiplexes a transmission signal destined for the first wireless terminal and a transmission signal destined for the second wireless terminal in a certain symbol time, and transmits the transmission signals.

11. The wireless base station according to claim 9, wherein the controller controls to increase the transmission power within a range in which a sum of transmission powers in a frequency axial direction in a certain symbol time does not exceed an allowable transmission power.

12. The wireless base station according to claim 8, wherein the controller controls to hold down a sum of increased quantities of transmission powers resulting from the increase control on a plurality of the second wireless terminals to a sum of decreased quantities of transmission powers or below resulting from the decrease control on a plurality of the first wireless terminals.

13. A method for controlling transmission power in a wireless base station which selects a transmission scheme according to signal quality information between the wireless base station and a wireless terminal, and transmits to the wireless terminal, the method comprising:

on the wireless base station,
     obtaining signal quality information between each of a plurality of wireless terminals and base station; and
     controlling distribution of transmission powers to wireless terminals corresponding to signal quality information in a range in which a transmission scheme to be selected remains unchanged so that a transmission scheme to any one of the wireless terminals becomes a transmission scheme having higher transmission efficiency than a transmission efficiency of a transmission scheme which is selected based on the signal quality information according to a position of the wireless terminal in the range of the signal quality information.

14. A wireless base station comprising:

a transmitter that increases a transmission power for at least first wireless terminal among a plurality of wireless terminals having reception quality information lying in a predetermined range to provide a reception quality exceeding the predetermined range, and transmits data in a first transmission scheme, while decreasing a transmission power for at least second wireless terminal among the plural wireless terminals so that a reception quality is lying in the predetermined range, and transmitting data in a second transmission scheme having lower transmission efficiency than transmission efficiency of the first transmission scheme; and a time zone being provided, in which a transmission period in the first transmission scheme and a transmission period in the second transmission scheme are at least overlapped.

\* \* \* \* \*